United States Patent [19]

Staffin et al.

[11] Patent Number: 4,457,788
[45] Date of Patent: Jul. 3, 1984

[54] PARTICULATE MEDIUM FOR FLUIDIZED BED OPERATIONS

[75] Inventors: Herbert K. Staffin; Robert Staffin, both of Colonia, N.J.

[73] Assignee: Procedyne Corp., New Brunswick, N.J.

[21] Appl. No.: 353,324

[22] Filed: Mar. 1, 1982

Related U.S. Application Data

[63] Continuation-in-part of Ser. No. 121,919, Feb. 15, 1980, abandoned.

[51] Int. Cl.$^3$ .............................................. C21D 1/53
[52] U.S. Cl. ................................. 148/20.3; 72/41; 72/286; 432/27; 148/27; 148/30
[58] Field of Search ............. 432/15, 58, 16, 16.3, 432/16.5, 16.6, 16.7, 20.3, 22, 27, 28, 30; 72/286, 39, 200, 41, 202, 43; 266/106, 111, 135; 148/6.3, 6.35, 27, 30, 22

[56] References Cited

U.S. PATENT DOCUMENTS

| | | | |
|---|---|---|---|
| 2,519,127 | 8/1950 | Fessler | 148/6.35 |
| 2,767,838 | 10/1956 | Nachtman et al. | 72/286 |
| 2,870,903 | 1/1959 | Leduc | 72/286 |
| 3,085,034 | 4/1963 | Croessant | 148/6.35 |
| 3,197,346 | 7/1965 | Munday | 148/20.3 |
| 3,760,488 | 7/1973 | Cucuz | 29/557 |

FOREIGN PATENT DOCUMENTS 9106 of 1963 Japan ..................................... 148/14

*Primary Examiner*—L. Dewayne Rutledge
*Assistant Examiner*—Christopher W. Brody
*Attorney, Agent, or Firm*—Kane, Dalsimer, Kane, Sullivan and Kurucz

[57] ABSTRACT

This invention relates to non-abrasive, lubricative, particulate solids, e.g. graphites, lime, calcium oxides, zinc oxides and compounds of higher saturated fatty acids, particularly, stearate salts, and their methods of use as fluidized bed media for preventing clinging and related carryover problems. Preferably, fluidized bed media, selected in accordance with this invention, have a beneficial effect on subsequent process operations.

7 Claims, No Drawings

PARTICULATE MEDIUM FOR FLUIDIZED BED OPERATIONS

This application is a continuation in part of my copending U.S. patent application Ser. No. 121,919 filed Feb. 15, 1980, now abandoned.

This invention relates to the field of fluidized bed heat treatment processes and particularly, the solid bed media used in such processes.

BACKGROUND OF THE INVENTION

The advantages of fluidized bed thermal treatment, specifically, high fuel efficiency, uniform heating or cooling, safety, and low cost are well known.

Typical fluidized bed devices include the following principal parts: a reaction vessel having a fluidized bed portion, a particulate solid heat transfer media, i.e. fluidized bed media, disposed within the bed portion of the reaction vessel and a gas distributor plate. The gas distributor plate causes a separately supplied fluidizing gas, e.g. air or nitrogen to pass upwardly through the fluidized bed media suspending the bed media particles therein, creating an expanded mass. The expanded mass exhibits thermal properties usually associated with low viscosity liquids, particularly, high heat transfer rates and high temperature uniformities. The temperature of the expanded fluidized bed media may easily be controlled by heating or cooling the reaction vessel and/or the fluidizing gas. A workpiece may be rapidly heated or cooled by submersion in expanded bed media maintained at a predetermined temperature.

Applications of fluidized beds in heat treating processes involving preheating of raw materials prior to other steps, e.g. forming operations, curing, or thermosetting, etc., have been complicated or altogether defeated by problems resulting from conventional refractory fluidized bed media, clinging to the heated workpieces and being carried into subsequent process steps. For example, the advantages of fluidized bed preheating are often very desirable in metal forging, rolling or extruding processes etc., however, known bed media are abrasive refractory particles such as aluminum oxides, and silica sands which, if they cling to the heated workpiece, can cause damage to the equipment performing subsequent process operations and/or cause defects in the finished product. Attempts to eliminate this problem calling for special treatment of the workpiece or raw material before or after the preheating steps have met with varying degrees of success. The major disadvantage of these approachs is that they invariably involve additional equipment and process time leading to significantly greater production costs.

SUMMARY OF THE INVENTION

The present invention comprises natural and synthetic non-abrasive lubricative particulate solids, e.g. graphites, lime, calcium oxide, zinc oxides, compounds of higher saturated fatty acids particularly stearate salts, and their use in fluidized beds for thermal treatment processes. It is an object of the present invention, to obviate the problems recited in the preceding paragraphs, that result from clinging bed media, carryover, and the like without requiring additional equipment or increased process time. This is accomplished by selecting a non-abrasive fluidized bed media having lubricating properties, that operate satisfactorily with respect to fluidizing and heat-transfer, and that does not cling excessively to the workpiece nor adversely affect subsequent process operations. Preferably, the selected fluidized bed medium has a beneficial effect on subsequent process operations. Specifically, in metal forming operations natural and synthetic graphite and graphite compounds, lime, calcium oxide, and like compounds may be used as bed media to achieve the above objects. In fact, graphite is often used as a lubricant in metal forming equipment and its carryover from the fluidized bed actually has a beneficial effect in subsequent process steps.

It has been found that particulate lime i.e. calcium oxide, and the like, make useful non-abrasive, lubricative fluidized bed media that operate within the spirit and scope of the present invention. The inorganic type fluidized bed media are preferable for high temperature applications because they will not burn as easily as some of the other suggested compounds, e.g. graphites; except that graphite can be used with non-oxidizing atmospheres, e.g., nitrogen, forming gas, at extremely high temperatures.

Particulate zinc oxides and higher saturated fatty acids, e.g. stearate salts, have been found to be suitable fluidized bed media for textile processes requiring thermal treatment operations.

DESCRIPTION OF PREFERRED EMBODIMENTS

In one preferred embodiment of the present invention, a forging process, graphite bed media may be used in a fluidized bed aluminum billet pre-heater, operating at temperatures preferably in the neighborhood of 850° F. The graphite bed media will not cling excessively to the aluminum billets nor damage dies used in subsequent forging operations as do prior art bed media, e.g. silica sand or aluminum oxide. Moreover, the graphite that is carried out of the fluidized bed by the aluminum billets is beneficial to subsequent forging operations.

The graphite bed for this process may have an average particle size of 20 to 240 mesh preferably 60 to 150 mesh and be of lubricative grade having a low ash content. Suitable graphites are commercially available from Asbury Graphite, Main Street, Asbury, NJ 08802. It will be appreciated that mixtures of natural or synthetic graphite with other nonabrasive bed media, and the like, and various substituted graphite compounds will operate as bed media within the intended scope of this invention as defined in the appended claims.

In another embodiment of the present invention that is useful in the wire industry large coils of wire strand to be thermally treated, are submerged in a fluidized bed having a lubricative graphite bed media approximately 150 mesh maintained at about 770° F. After a short time, the heated wire is mechanically removed from the fluidized bed as a strand by pulling and thereby unwinding the coil. The graphite bed media carried out of the fluidized bed by the wire strand operates as a lubricant useful subsequent drawing operation and prevents damage to drawing dies. This process would not be possible using conventional fluidized bed media because their abrasive character would rapidly destroy the drawing dies.

In other embodiments of the present invention a bed media of zinc oxides or compounds of higher (between 16 and 20 carbon) saturated fatty acids, e.g. stearate salts, are used for heat treatment operations in synthetic yarn processing. For example, if a process calls for heat curing yarn at temperatures in the neighborhood of 200°

F. prior to weaving, the heating step may be carried out in a fluidized bed utilizing zinc oxide, or stearate type materials as bed media. Consequently, excessive clinging of bed media is avoided and since these compounds operate as lubricants in subsequent process steps, i.e. weaving, the bed media carry over is actually beneficial to overall operation of the process and avoids damage to valuable looms.

Particulate zinc oxides and sterate compounds, having suitable particle sizes of 20 to 240 mesh, preferably 60 to 150 mesh, are readily available from commercial suppliers in forms suitable for fluidized bed media. It will be appreciated that various mixtures of the above compounds and mixtures with other materials will operate within the intended scope and spirit of the present invention as defined in the appended claims.

While in order to comply with the Patent Laws this invention is described above in more or less specific terms, it is understood that it is claimed in any of its forms or modifications within the legitimate and valid scope of the appended claims.

What is claimed is:

1. An improved thermal treating process in a metal processing operation which prepares a workpiece for subsequent processing operations wherein the improvement comprises: carrying out at least one thermal treatment operation on a workpiece in a fluidized bed having a particulate lubricative non-abrasive bed medium which eliminates abrasive damage to the workpiece, minimizes interference with subsequent process operations due to particles from the particulate medium clinging to the workpiece, and lubricates the workpiece.

2. An improved thermal treating process as recited in claim 1 wherein the fluidized bed medium is selected from the group consisting of graphite compounds.

3. An improved thermal treating process as recited in claim 1 wherein the fluidized bed medium is graphite.

4. An improved thermal treating process as recited in claim 1 wherein the fluidized bed medium is lime.

5. An improved thermal treating process as recited in claim 1 wherein the fluidized bed medium is calcium oxide.

6. An improved thermal treating process as recited in any one of claims 1, 2, 3, 4, or 5 wherein the fluidized bed medium has a particle size substantially in the range of 20 to 240 mesh.

7. An improved thermal treating process as recited in any one of claims 1, 2, 3, 4, or 5 wherein the fluidized bed medium has a particle size substantially in the range of 60 to 150 mesh.

* * * * *